Feb. 24, 1925.

W. SIEKE

ANTISLIPPING DEVICE

Filed April 30, 1924

1,527,753

Inventor.
William Sieke
By his Attorney
George C. Heinicke

Patented Feb. 24, 1925.

1,527,753

UNITED STATES PATENT OFFICE.

WILLIAM SIEKE, OF WEST HOBOKEN, NEW JERSEY.

ANTISLIPPING DEVICE.

Application filed April 30, 1924. Serial No. 710,035.

*To all whom it may concern:*

Be it known that I, WILLIAM SIEKE, a citizen of the Republic of Germany, and resident of West Hoboken, in the county of Hudson and State of New Jersey, have invented certain new and useful Antislipping Devices, of which the following is a specification.

This invention relates to improvements in anti-skidding devices for vehicle wheels, particularly automobile trucks or the like, and it is the principal object of the invention to provide a device of this character which is extremely simple and inexpensive and which may readily be attached to any vehicle wheel.

Another object of the invention is the provision of a device of this class which is intended to replace the customary chains etc., which very easily break under stress and become useless within a short time by use and are liable to damage the tires.

A further object of my invention is the provision of an anti-skidding device for the full tires of automobile trucks which ordinarily show a groove in their center, and one which consists of metal frames equipped with a central loop adapted to enter the groove of the tire.

A still further object of my invention is the provision of an anti-skidding device for automobile truck tires which have no central groove.

It is also one of the objects of my invention to provide an anti-skidding device for truck tires, the frames of which are provided with exchangeable road engaging prongs.

Furthermore, my invention relates to improvements in anti-skidding devices for truck tires which allow an adjustment relative to the wear of the tire, and a locking of the parts in their adjusted positions.

These and other objects of my invention and advantages thereof will become more fully apparent as the description thereof proceeds, and will then be specifically pointed out in the appended claim.

In the accompanying drawing, forming a material part of this disclosure:

Figure 1:
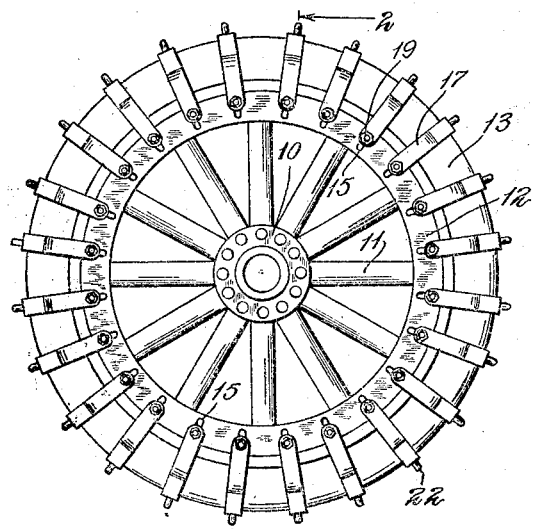
Figure 1 shows in side elevation a truck wheel equipped with a device constructed according to my invention.
Figure 2:
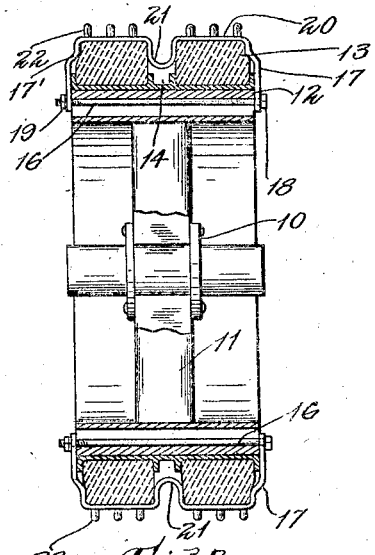
Figure 2 is a vertical section through the wheel and anti-skidding device on line 2—2 of Figure 1.
Figure 3:
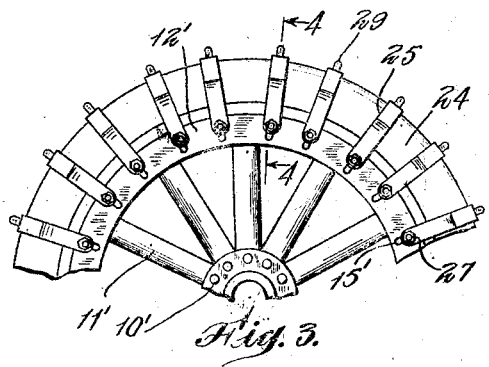
Figure 3 is a fragmentary side elevation of a truck wheel equipped with a modified form of my device.
Figure 4:
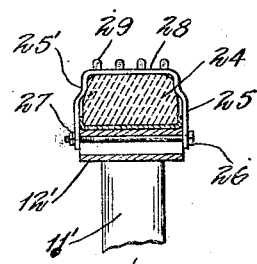
Figure 4 is a section on line 4—4 of Figure 3.
Figures 5, 6:
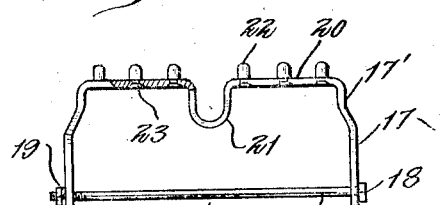
Figure 5 is a front elevation of one of the frame or hoop members forming the anti-skidding device, Figure 1, partly in section.
Figure 6 is an end view thereof.
Figures 7, 8:
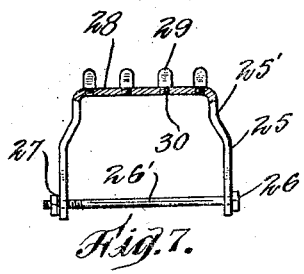
Figure 7 is a front elevation of a modified form of a frame member forming the anti-skidding device, Figure 3.
Figure 8 is an end view thereof.

A truck wheel of any type having the customary hub 10, a plurality of spokes 11 radiating therefrom, and a felly 12, is equipped as shown in Figure 2 with a full tire 13 provided with the customary center groove 14. The felly 12 has a plurality of elongated slots or holes 15 through which pass the bars or rods 16 forming the base of metal frames or members 17 which connect the free ends of the lateral branches of the frames, and carry at one end nuts 18, while at their opposite threaded ends passing through the opposite branch they carry outside of the frame also adjusting nuts 19. In this manner an adjustment of the frames is possible to make up for the wear of the tire, as will be readily understood.

The lateral branches of the frames are connected on top by a bar 20 provided in its center part with a depending loop 21 adapted to fit into the groove 14, while a plurality of prongs 22 are riveted or otherwise secured to bar 20 as shown at 23 and are adapted to engage with their free ends the road bed.

It will be clear that the elongated slots 15 may be dispensed with and that the bars or rods 16 may be passed through the wheel in engagement with the inner periphery of its rim without departing from the spirit of my invention. The parts will then be kept in their proper adjustment by the nuts 18 and 19, while the engagement of the loop 21 in the groove 14 will prevent lateral displacement.

In the modified form of the device illustrated in Figures 3, 4, 7 and 8, the wheel has also a hub 10', spokes 11', and a rim 12' provided with a plurality of elongated openings or holes 15'. The rim 12' however carries a full tire 24 having no central groove, and the frames 25 have the lower ends of their lateral branches connected by base rods or bars 26' passing through the holes 15', and through the ends of the lateral members of the frames, on the outside of which they carry nuts 26, while their opposite outer threaded ends carry adjusting nuts 27. The upper bar 28 of each frame constituting the anti-skidding device, connects the upper ends of the lateral branches of the frames and carries a plurality of prongs 29 which are exchangeably screwed into said upper bar as at 30. The lateral branches of frames 17 have rounded upper shoulders 17' to adapt the frames to the outer shape of the truck tire, while the lateral branches of frames 25 have similar curved parts or shoulders 25' to adapt them to the shape or outer curvatures of the tire faces.

It is to be understood that the drawing illustrates by way of example only two ways of executing my invention in practice and that many other ways may be devised and that such changes in the general arrangement, and in the construction of the minor details of my invention may be made as fall within the scope of the appended claim without deviating or departing from the spirit of my invention.

Having thus described my invention, what I claim as new, and desire to secure by Letters Patent is:—

An anti-slipping device for automobile truck wheels having solid tires provided with a central groove, comprising a plurality of metal frames each having an outer bar, a depression or loop integral with said bar and in the center thereof adapted to engage in the groove of the tire, said outer bar adapted for the exchangeable reception of a plurality of prongs to both sides of said loop, two lateral branches formed with said outer bar extending therefrom and each having a perforated inner end, said branches curved near their outer ends to conform to the outer contour of the truck tire at its lateral faces, a bolt adapted to be passed through the perforations in said branches and through perforations in the wheel felly allowing a limited adjustment of the device for making up for the wear of the tire, and means on said bolt for adjustably securing said frame on the wheel.

Signed at West Hoboken, in the county of Hudson and State of New Jersey, this 25th day of April A. D. 1924.

WILLIAM SIEKE.